US008434146B2

(12) United States Patent
Forstall et al.

(10) Patent No.: US 8,434,146 B2
(45) Date of Patent: Apr. 30, 2013

(54) ACCESS CONTROL BASED ON DEVELOPMENT PROFILES

(75) Inventors: Scott Forstall, Mountain View, CA (US); Maxwell O. Drukman, San Francisco, CA (US); Andreas Wendker, Mountain View, CA (US); D. Matthew Firlik, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 532 days.

(21) Appl. No.: 12/397,968

(22) Filed: Mar. 4, 2009

(65) Prior Publication Data

US 2009/0228979 A1 Sep. 10, 2009

Related U.S. Application Data

(60) Provisional application No. 61/033,747, filed on Mar. 4, 2008.

(51) Int. Cl.
*G06F 21/00* (2006.01)
(52) U.S. Cl.
USPC ............ 726/21; 705/51; 705/52; 705/53; 705/54; 713/189; 713/190; 713/191; 713/192; 713/193; 713/194; 717/168; 717/169; 717/170; 717/171; 717/172; 717/173; 717/174; 717/175; 717/176; 717/177; 717/178; 726/2; 726/22

(58) Field of Classification Search ............ 726/21, 726/2, 22; 713/189–194; 705/51–54; 717/168–178
See application file for complete search history.

(56) References Cited

U.S. PATENT DOCUMENTS

| 5,987,625 | A  | * | 11/1999 | Wolff ................. 714/36 |
| 7,024,693 | B2 | * | 4/2006  | Byrne ................. 726/21 |
| 7,073,172 | B2 | * | 7/2006  | Chamberlain ........... 717/169 |
| 7,707,564 | B2 | * | 4/2010  | Marvin et al. ............ 717/140 |
| 7,823,214 | B2 | * | 10/2010 | Rubinstein et al. ......... 726/34 |
| 7,831,734 | B2 | * | 11/2010 | Bernhard et al. .......... 709/248 |
| 7,874,008 | B2 | * | 1/2011  | Chang et al. ............ 726/27 |
| 8,103,264 | B2 | * | 1/2012  | Qumei et al. ............ 455/418 |
| 2006/0143601 | A1 | * | 6/2006 | Concha et al. ........... 717/170 |
| 2006/0282815 | A1 | * | 12/2006 | Yodaiken et al. .......... 717/101 |

* cited by examiner

*Primary Examiner* — Andy Rao
*Assistant Examiner* — Shan Elahi
(74) *Attorney, Agent, or Firm* — Blakely, Sokoloff, Taylor & Zafman LLP

(57) ABSTRACT

Systems and methods for selectively providing access to a media device based on a profile associated with the media device. In certain embodiments, the profile of the media device can be user-defined as a development profile or a personal profile. When the device is connected to a host computer system, the profile of the media device is accessed. If the profile of the media device is a development profile, an integrated development environment on the host computer system can access the media device. If the profile of the media device is a personal profile, the integrated development environment is prevented from accessing the device.

16 Claims, 9 Drawing Sheets

ACCESS CONTROL BASED ON DEVELOPMENT PROFILES

This U.S. patent application claims priority to U.S. Provisional Patent Application No. 61/033,747, entitled, "MANAGEMENT OF MEDIA DEVICE PROFILES" filed Mar. 4, 2008.

BACKGROUND

There are many types of media devices currently available for presenting various types of media content to a user. For example, televisions, radios, computers, and a variety of portable or handheld devices are available for presenting various types of audio and/or visual information to a user. Some examples of portable devices include music players (e.g., MP3 players), cell phones, smart phones, personal digital assistants (PDAs), portable televisions, laptops, and the like.

In presenting media to a user, one or more software applications are generally run on a processor of the media device. Applications are also often provided for other purposes, such as game playing, web browsing, and so on. Development of software for such devices can often involve testing the software directly on the media device. However, software under development can include errors or "bugs" that can render the media device unstable.

DETAILED DESCRIPTION

In certain embodiments, systems and methods are provided for selectively providing access to a media device that address some or all of the above-mentioned problems. These systems and methods can advantageously prevent developers from accidentally testing software on their personal device. In certain embodiments, these benefits can be achieved by associating certain media devices with software development profiles. In certain embodiments, only those media devices that are associated with development profiles can be accessed for software development and testing purposes.

The features of these systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the inventions disclosed herein.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined into a single block or state. Moreover, the various modules of the systems described herein can be implemented as software applications, modules, or components on one or more computers, such as servers. While the various modules are illustrated separately, they may share some or all of the same underlying logic or code.

Figure 1:
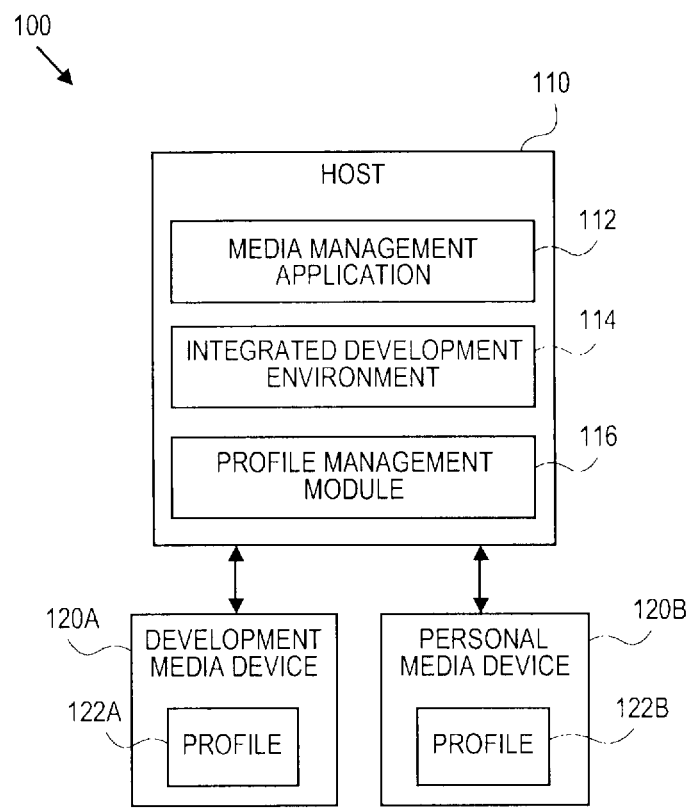
FIG. 1 is a block diagram illustrating certain embodiments of a computer system for managing media device profiles.

FIG. 1 illustrates an example profile management system 100. Certain embodiments of profile management system 100 facilitate preventing a user from unintentionally loading test or pre-production software to certain media devices 120. Advantageously, profile management system 100 can achieve these benefits by creating and managing profiles 122 for media devices 120.

In certain embodiments of profile management system 100, one or more media devices 120 can be placed into communication with host computer system 110 by tethering with a cable, by a wireless connection, by a network connection, or the like. Each media device 120 can be any media or portable device, such as but not limited to a music player, MP3 player, a cell phone, handheld television, a personal digital assistant (PDA), a laptop, combinations of the same, and the like.

In the example embodiment shown, two media devices 120 are depicted. Development media device 120a may be used for development purposes, and personal media device 120b may be used for personal purposes. Personal purposes may include any use that does not include development of software, such as, for example, the listening of music, placing and receiving phone calls, watching video, running applications, combinations of the same, and the like. In certain embodiments, development media device 120a can also be used for some personal purposes.

Each media device 120 in certain embodiments has profile 122 associated with media device 120. Profile 122 can be a file or the like that includes data that indicates whether media device 120 may be for development or personal use. In the depicted embodiment, profiles 122 are stored on media devices 120. In alternative embodiments, profiles 122 can be stored on host computer 110 or on a remote device or network resource, example embodiments of which are described below with respect to FIGS. 4 through 6.

Development media device 120a has development profile 122a, and personal media device 120b has personal profile 122b. Profiles 122 can be stored, for example, on a disk or memory of media players 120, or even on a memory card or the like that can be inserted into media players 120. Profiles 122 can be created, accessed, and managed by host 110, as described below.

Host 110 in certain embodiments includes media management application 112, integrated development environment (IDE) 114, and profile management module 116. Media management application 112 may be a module, application, or the like that can be included in some hosts 110 but which may not be included with all hosts 110. Media management application 112 can be used to manage media on host 110 and/or on media devices 120. For example, media management application 112 can be used to purchase media from a remote network resource on a communications medium such as the Internet. Media management application 112 can transfer this or other media from host 110 to one or more media devices 120 and can also transfer media from media devices 120 to host 110. Media management application 112 can be used or accessed by personal media devices 120*b* in certain embodiments. In some implementations, development media device 120*a* can also access media management application 112. Accessing media management application 112 with development media devices 120*a* can be advantageous for some software testing situations.

IDE 114 can be a component, module, or application used for developing software for media devices 120 and for downloading test software to media devices 120. IDE 114 can be, for example, part of a software development kit (SDK). In certain implementations, IDE 114 accesses profile 122 of media device 120 in response to media device 120 being placed in communication with host 110. If media device 120 has development profile 122*a*, then IDE 114 will be enabled to access media device 120 for software development and testing purposes.

Additionally, in certain implementations, when media device 120*a* having development profile 122*a* may be placed in communication with host 110 (e.g., by tethering), IDE 114 can be launched automatically. Launching IDE 114 automatically can include causing an image of IDE 114 to be placed into memory. Alternatively, prior to launch, an image of IDE 114 may already be loaded into memory, but IDE 114 may be minimized or otherwise not displayed on a display of host 110. In such a situation, launching IDE 114 can include causing a user interface of IDE 114 to be maximized or otherwise made viewable to a user.

If media device 120 has personal profile 122*b*, or alternatively, in some embodiments if media device 120 has no profile, IDE 114 cannot access media device 120 for software development and testing. In certain embodiments, preventing access of IDE 114 to personal media device 120 can prevent software that may be in development from being downloaded to personal media device 120*b*. Thus, a software developer who uses both development and personal media devices 120*a*, 120*b* cannot easily mistakenly load test software onto personal media device 120*b*.

Profile management module 116 may be a software module, component, application, or the like that can be used to create and manage profiles 122. On first connection of media device 120 to host 110, profile management module 116 can detect the presence of media device 120 and determine whether profile 122 exists for media device 120. If profile 122 does not exist, profile management module 116 can create one in certain embodiments. Profile management module 116 can create profiles, in one embodiment, according to a user-defined setting that may be accessible within a user interface of profile management module 116. Thus, for example, profile management module 116 may present a user interface having a set of options for choosing whether to assign personal or development profile 122 to media device 120.

In addition, profile management module 116 can be used in certain embodiments to change profile 122 from development profile 122*a* to personal profile 122*b* and vice versa. In addition, profile management module 116 can be used to delete profile 122. In certain embodiments, profile management module 116 may be part of the IDE 114.

In some alternative embodiments, profiles 122 are not stored on media devices 120 but are instead stored on host 110 or on another network resource that may be in communication with host 110. Examples of other methods for storing profiles 122 are described below with respect to FIGS. 5 and 6.

Additionally, in certain alternative embodiments, no profile 122*b* may be used in association with personal device 120*b*. Rather, profile 122*a* may be used only in association with development media device 120*a*. As a result, IDE 114 in certain embodiments can access media devices 120*a* that have profile 122 and deny access to media devices 120 that do not have a profile. In still other embodiments, both development media device 120*a* and personal media device 120*b* can have profiles 122*a*, 122*b* that have development and personal options. Profile management module 116 can selectively activate or deactivate the respective options according to user preferences. Many other configurations of profiles 122 are possible.

Figure 2:
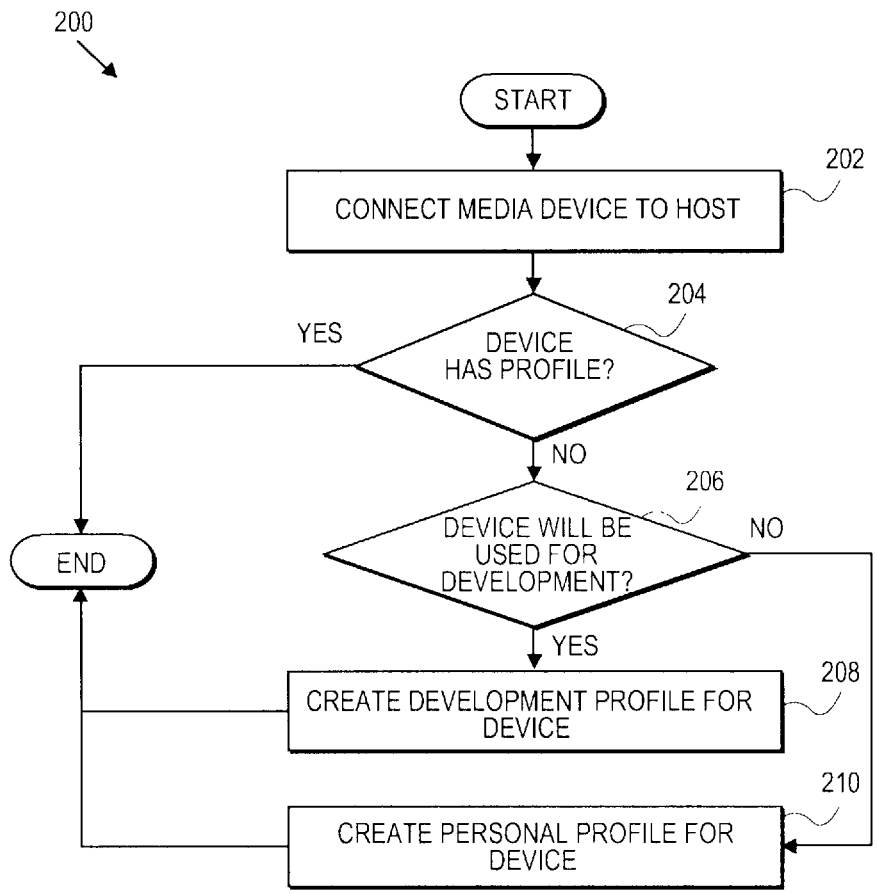
FIGS. 2 and 3 are flowchart diagrams illustrating certain embodiments of processes for managing media device profiles.

FIG. 2 illustrates certain embodiments of process 200 for creating profiles for a device. In certain embodiments, process 200 can be implemented by any of the computer systems described herein, including profile management system 100 or any of the systems described below. Process 200 or portions thereof can be performed, for example, by profile management module 116. Advantageously, certain embodiments of process 200 enable a developer to have a development device with a development profile so that the developer does not accidently transfer test software to the developer's personal device.

At block 202, a media device may be connected or otherwise placed in communication with a host. This block 202 can be performed by a user in one embodiment. The media device can be connected to the host by, for example, tethering with a cable (e.g., a universal serial bus cable), through a wireless connection, over a communications medium such as a network, combinations of the same, and the like.

At block 204, it may be determined whether the media device has a profile. This block 204 can include, for example, accessing a profile stored on the media device or accessing a profile stored on a network resource. If the device has a profile, then process 200 ends. Otherwise, it may be further determined at block 206 whether the device will be used for development. Block 206 can include providing a user with user interface options for choosing whether the device will be a development or personal device.

If the media device will not be used for development, at block 210 a personal profile can be created for the device. Otherwise, a development profile can be created for the device at block 208. The profile created in block 208 or 210 can be transferred to the media device or can be stored elsewhere, such as on the host connected to the media device or on a separate server or database.

Figure 3:
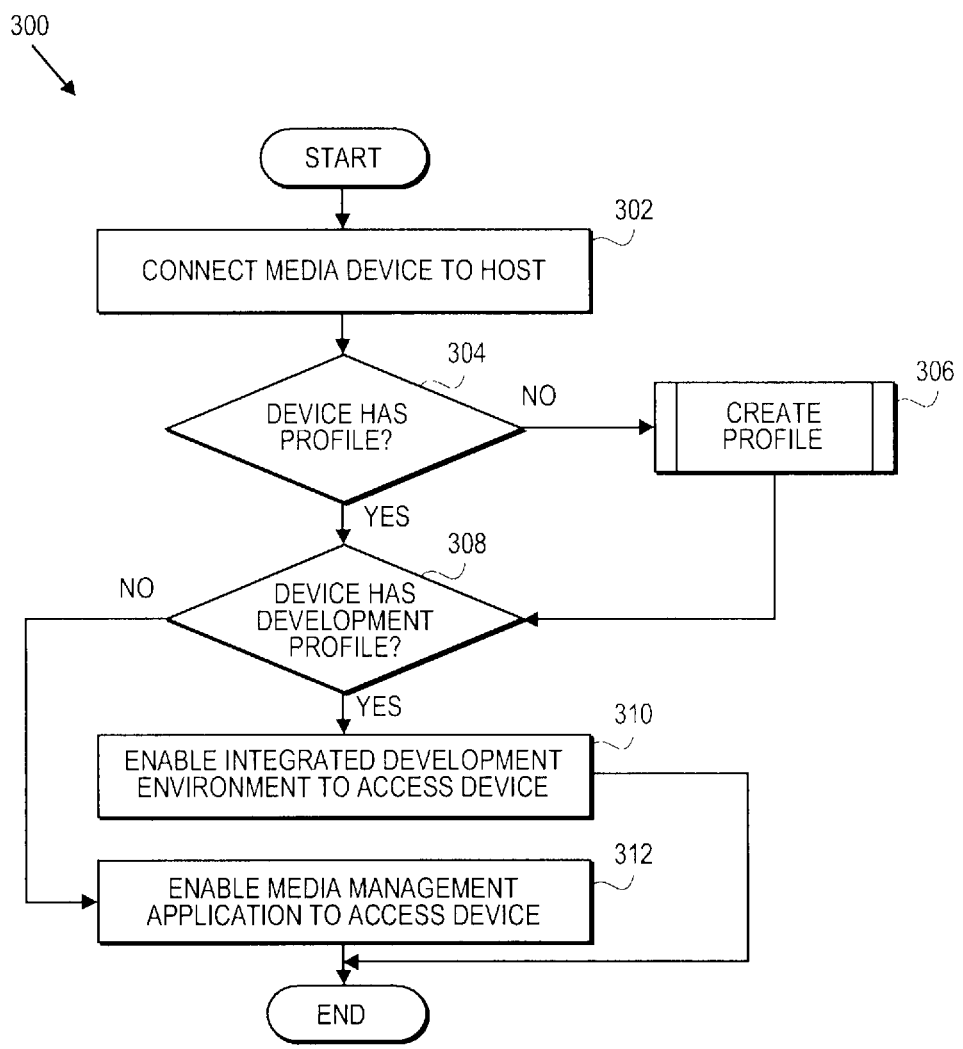

FIG. 3 illustrates an example process 300 for enabling access to a media device. Process 300 can be implemented in certain embodiments by any of the systems described herein. In one implementation, process 300 or portions thereof are performed by profile management module 116 described above with respect to FIG. 1. Advantageously, process 300 in certain embodiments enables an integrated development environment to selectively access a device having a specified profile.

At block 302, a media device may be connected to or otherwise placed in communication with a host by, for example, a user. At block 304, it may be determined whether the device has a profile. This block 304 can include accessing a profile on the device, host, or a network resource. If the device does not have a profile, a profile may be created at block 306. Creating a profile at block 306 can include performing one or more of the blocks described above with respect to process 200 at FIG. 2. Once the profile is created at block 306, the process then proceeds to block 308. Likewise, if the device already has a profile, the process proceeds to block 308.

It may be determined at block 308 whether the profile of the device may be a development profile. Determining whether the device has a development profile can include reading one or more parameters stored in a profile file. If the device does not have a development profile, then a media management application can be enabled in certain embodiments to access the device at block 312. The media management application can have some or all of the features described above with respect to FIG. 1. In one embodiment, enabling the media management application to access the device includes automatically launching the media management application upon connection of the media device to the host.

Alternatively, if the device does have a development profile, then at block 310 an IDE can be enabled to access the device. The IDE may have some or all of the features described above with respect to FIG. 1. Enabling the IDE to access the media device can include enabling the IDE to download software to the device for development and testing purposes. Enabling the IDE to access the device can also include enabling a simulator in the IDE to access the device. In addition, enabling the IDE to access the device can also include automatically launching the IDE in response to the media device being connected to the host or otherwise being placed in communication therewith.

Figure 4:
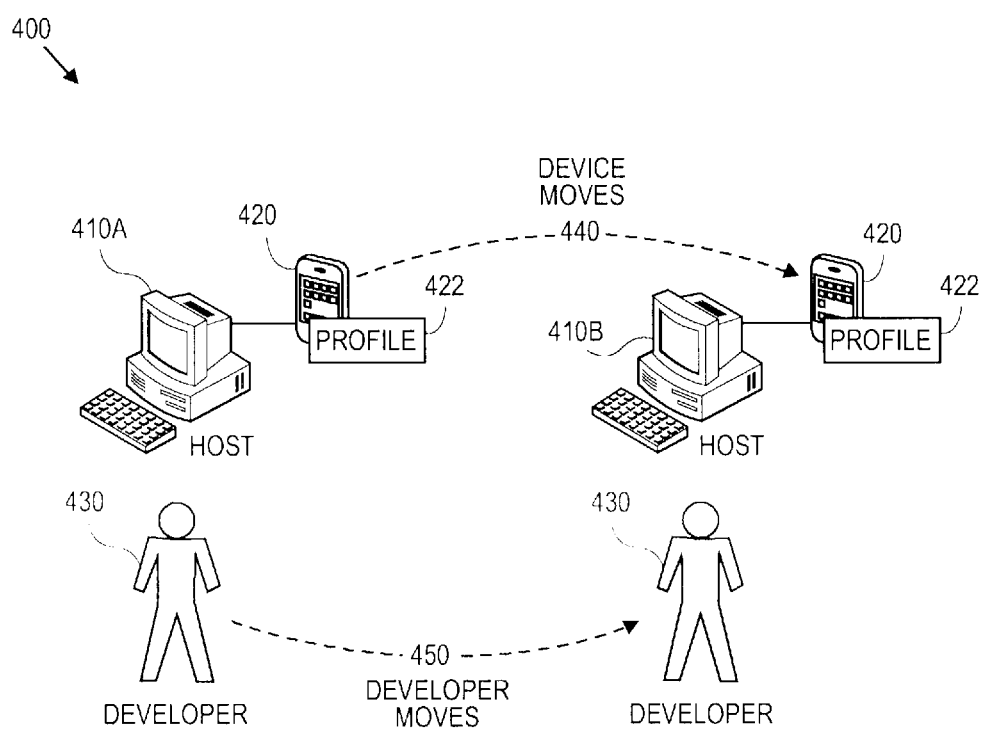
FIGS. 4 and 5 are block diagrams illustrating systems for managing media device profiles in a multi-host computer environment.

FIG. 4 illustrates certain embodiments of a development device management system 400. In system 400, development media device 420 can be moved or shared between different host computers 410. Advantageously, development profile 422 stored on media device 420 enables media device 420 to be shared amongst hosts 410.

One example situation in which system 400 may be implemented may be that of a development lab or development workgroup, where multiple developers share host computers 410 and/or development media devices 420. Accordingly, developers 430 may move from one host 410a to another host 410b and may desire to use the same media device 420 on both hosts 410a, 410b. Or, different developers 430 may share one media device 420 by connecting the media device 420 to different hosts 410.

Thus, in some instances device 420 may move (illustrated by the arrow 440) with developer 430 (illustrated by arrow 450) from first host 410a to be connected to second host 410b. Second host 410b can then determine if profile 422 exists for media device 420. Because profile 422 exists for the media device in the example embodiment shown, an IDE on second host 410b can access media device 420.

Figure 5:
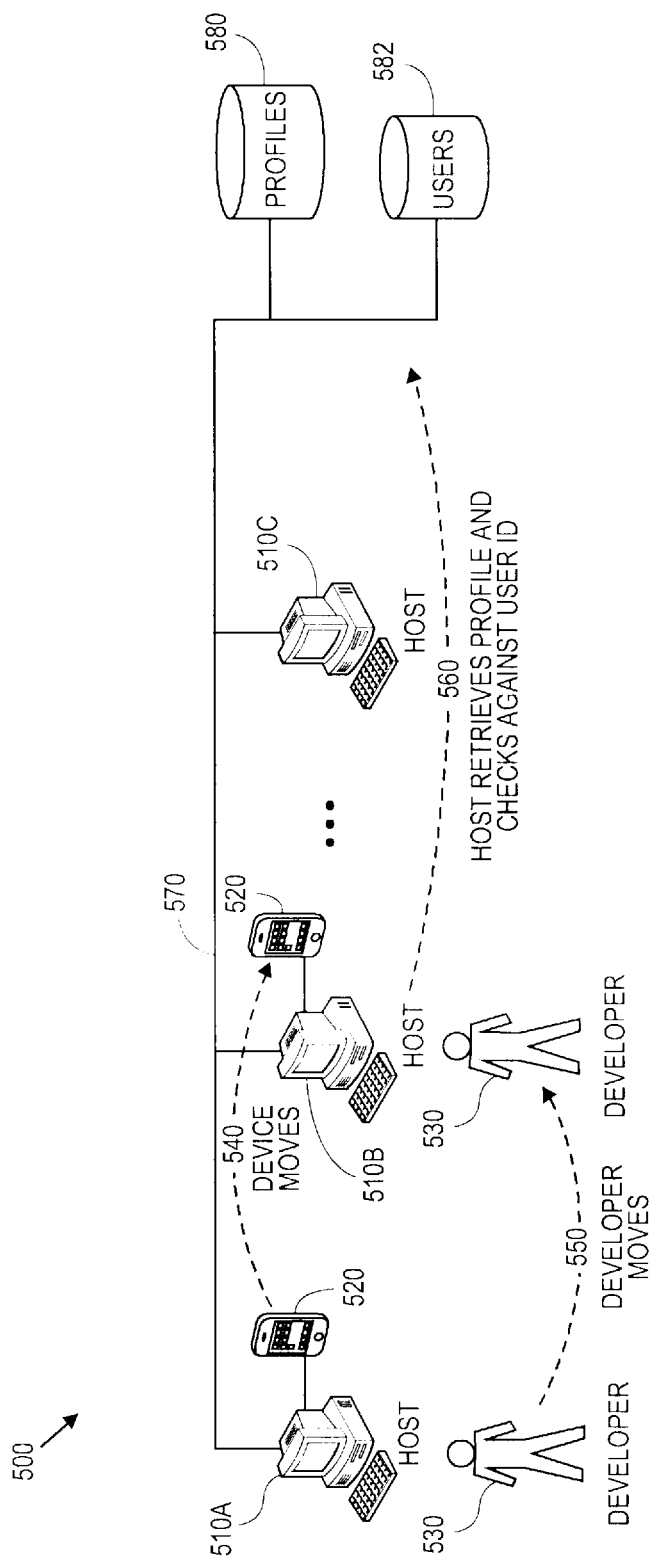

Turning to FIG. 5, another development device management system 500 is shown. Like system 400 of FIG. 4 described above, development media device 520 can be moved or shared between different host computers 510. Advantageously, a development profile stored on a network resource such as profile database 580 enables media device 520 to be shared amongst hosts 510.

In the depicted embodiment, media device 520 may be connected to first host 510a. In certain embodiments, first host 510a can access profiles database 580 over network 570 or other communications medium to determine whether media device 520 may be enabled for development. If a profile for media device 520 may be stored in profile database 580, first host 510a can access the profile and activate or otherwise enable an IDE on first host 510a to access media device 520.

In addition, host 510b can further determine if developer 530 has an authorized user ID or other security indicia for developing on media device 520. The user ID or other security indicia can be stored in user database 582 which may be accessed using network 570. In some embodiments, using security indicia can enable restricted access to development on media devices 520.

One or more other hosts 510b, 510c can also be in communication with network 570 and with database of profiles 580. If developer 530 decides to move to another host 510b (as shown by arrow 550), or if developer 530 shares device 520 with other developers, media device 520 can be moved to another host 510b (see arrow 540). In order to develop on media device 520, in one embodiment host computer 510b determines if device 520 has a profile in profile database 580. In addition, host 510b can determine if security indicia exists in user database 582 for developer 530, as illustrated by arrow 560. In one embodiment, if a profile and valid user ID exist, host 510b can then enable an IDE on host 510b to access media device 520 for software development and testing.

Figure 6:
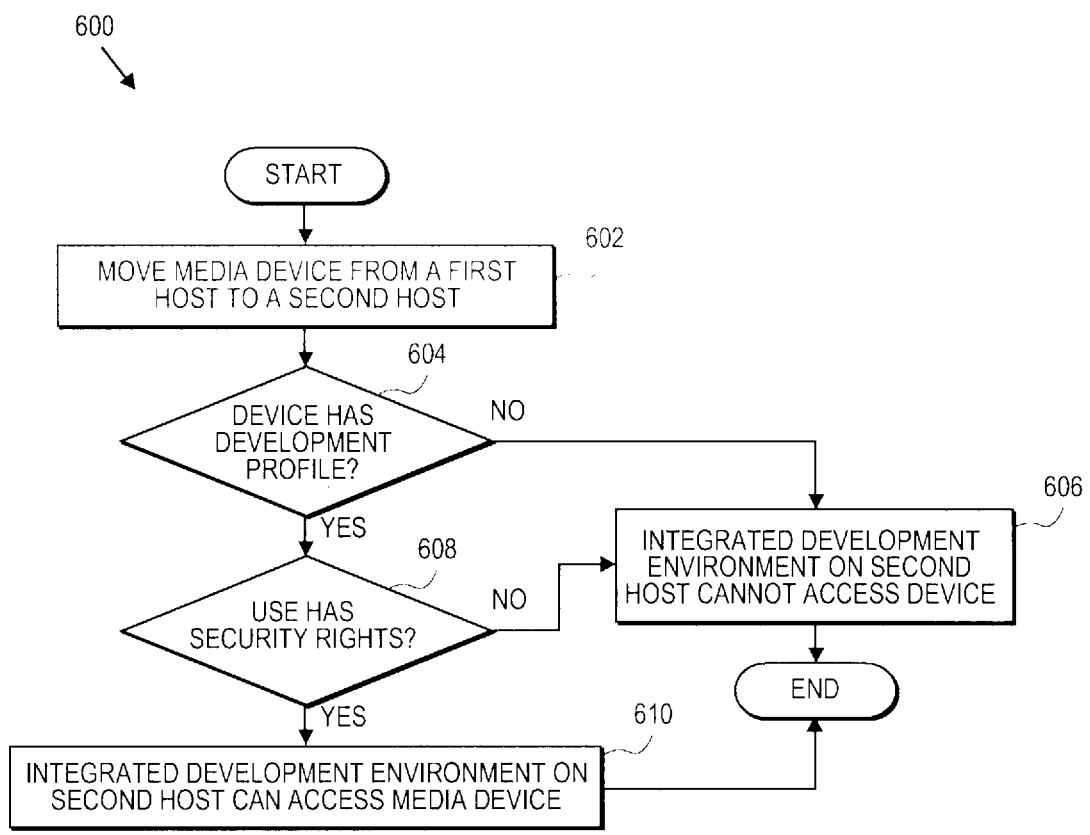
FIG. 6 is a flowchart diagram illustrating certain embodiments of a process for managing media device profiles in a multi-host computer environment.

FIG. 6 illustrates an example process 600 for providing access to a media device. Process 600 can be implemented in certain embodiments by any of the systems described above, such as for example system 400 or system 500.

At block 602, a media device may be moved from a first host to a second host. The media device can be moved, for example, by a developer who wishes to use the media device on the second host. The first and second hosts can be on a network or can be stand-alone hosts.

At block 604, it may be determined whether the device has a development profile. The development profile can be stored on the device or on a network resource such as a database of profiles. In addition, the profile can be stored on a host computer in communication with the device. Other locations for the profile can also be provided in certain embodiments.

If the device does not have a development profile, then at block 606, it may be determined that an IDE on the second host cannot access the device, and the process ends. Otherwise, if the device does have a development profile, at block 608 in certain embodiments it may be determined whether a user has security rights to access the device on the second host. Block 608 can include accessing a user identifier database or other network resource in some implementations. In alternative embodiments, the user security ID can be embedded on the media device on the host computer, or on a removable memory storage media such as a flash memory card or the like.

If the user does have security rights, the IDE on the second host can be enabled to access the media device at block 610. Otherwise, the IDE cannot access the device on the second host at block 606, and the process ends.

Figure 7A:
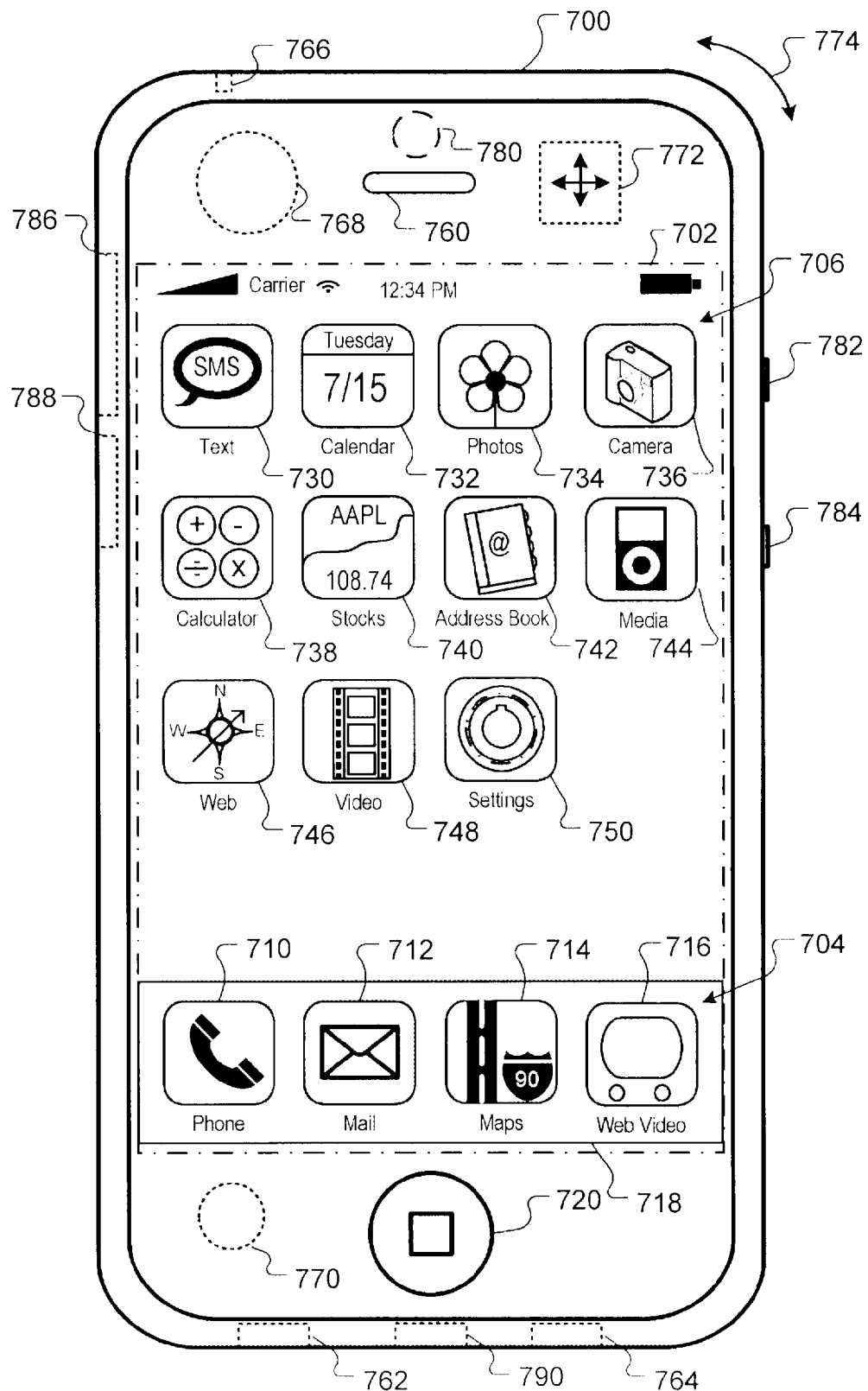
FIG. 7A is an elevation-view diagram illustrating an example mobile device that can be used with certain embodiments of the systems of FIGS. 1 through 3.

FIG. 7A illustrates an example mobile device 700. The mobile device 700 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 700 includes a touch-sensitive display 702. The touch-sensitive display 702 can be implemented with liquid crystal display (LCD) technology, light emitting polymer display (LPD) technology, or some other display technology. The touch-sensitive display 702 can be sensitive to haptic and/or tactile contact with a user.

In some implementations, the touch-sensitive display 702 can include a multi-touch-sensitive display 702. A multi-touch-sensitive display 702 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 700 can display one or more graphical user interfaces on the touch-sensitive display 702 for providing the user access to various system objects and for conveying information to the user. In some implementations, the graphical user interface can include one or more display objects 704, 706. In the example shown, the display objects 704, 706, are graphic representations of system objects. Some examples of system objects include device functions, applications, windows, files, alerts, events, or other identifiable system objects.

Example Mobile Device Functionality

In some implementations, the mobile device 700 can implement multiple device functionalities, such as a telephony device, as indicated by a Phone object 710; an e-mail device, as indicated by the Mail object 712; a map devices, as indicated by the Maps object 714; a Wi-Fi base station device (not shown); and a network video transmission and display device, as indicated by the Web Video object 716. In some implementations, particular display objects 704, e.g., the Phone object 710, the Mail object 712, the Maps object 714, and the Web Video object 716, can be displayed in a menu bar 718. In some implementations, device functionalities can be accessed from a top-level graphical user interface, such as the graphical user interface illustrated in FIG. 7A. Touching one of the objects 710, 712, 714, or 716 can, for example, invoke a corresponding functionality.

In some implementations, the mobile device 700 can implement a network distribution functionality. For example, the functionality can enable the user to take the mobile device 700 and provide access to its associated network while traveling. In particular, the mobile device 700 can extend Internet access (e.g., Wi-Fi) to other wireless devices in the vicinity. For example, mobile device 700 can be configured as a base station for one or more devices. As such, mobile device 700 can grant or deny network access to other wireless devices.

In some implementations, upon invocation of a device functionality, the graphical user interface of the mobile device 700 changes, or is augmented or replaced with another user interface or user interface elements, to facilitate user access to particular functions associated with the corresponding device functionality. For example, in response to a user touching the Phone object 710, the graphical user interface of the touch-sensitive display 702 may present display objects related to various phone functions; likewise, touching of the Mail object 712 may cause the graphical user interface to present display objects related to various e-mail functions; touching the Maps object 714 may cause the graphical user interface to present display objects related to various maps functions; and touching the Web Video object 716 may cause the graphical user interface to present display objects related to various web video functions.

In some implementations, the top-level graphical user interface environment or state of FIG. 7A can be restored by pressing a button 720 located near the bottom of the mobile device 700. In some implementations, each corresponding device functionality may have corresponding "home" display objects displayed on the touch-sensitive display 702, and the graphical user interface environment of FIG. 7A can be restored by pressing the "home" display object.

In some implementations, the top-level graphical user interface can include additional display objects 706, such as a short messaging service (SMS) object 730, a Calendar object 732, a Photos object 734, a Camera object 736, a Calculator object 738, a Stocks object 740, a Address Book object 742, a Media object 744, a Web object 746, a Video object 748, a Settings object 750, and a Notes object (not shown). Touching the SMS display object 730 can, for example, invoke an SMS messaging environment and supporting functionality; likewise, each selection of a display object 732, 734, 736, 738, 740, 742, 744, 746, 748, and 750 can invoke a corresponding object environment and functionality.

Additional and/or different display objects can also be displayed in the graphical user interface of FIG. 7A. For example, if the device 700 is functioning as a base station for other devices, one or more "connection" objects may appear in the graphical user interface to indicate the connection. In some implementations, the display objects 706 can be configured by a user, e.g., a user may specify which display objects 706 are displayed, and/or may download additional applications or other software that provides other functionalities and corresponding display objects.

In some implementations, the mobile device 700 can include one or more input/output (I/O) devices and/or sensor devices. For example, a speaker 760 and a microphone 762 can be included to facilitate voice-enabled functionalities, such as phone and voice mail functions. In some implementations, an up/down button 784 for volume control of the speaker 760 and the microphone 762 can be included. The mobile device 700 can also include an on/off button 782 for a ring indicator of incoming phone calls. In some implementations, a loud speaker 764 can be included to facilitate hands-free voice functionalities, such as speaker phone functions. An audio jack 766 can also be included for use of headphones and/or a microphone.

In some implementations, a proximity sensor 768 can be included to facilitate the detection of the user positioning the mobile device 700 proximate to the user's ear and, in response, to disengage the touch-sensitive display 702 to prevent accidental function invocations. In some implementations, the touch-sensitive display 702 can be turned off to conserve additional power when the mobile device 700 is proximate to the user's ear.

Other sensors can also be used. For example, in some implementations, an ambient light sensor 770 can be utilized to facilitate adjusting the brightness of the touch-sensitive display 702. In some implementations, an accelerometer 772 can be utilized to detect movement of the mobile device 700, as indicated by the directional arrow 774. Accordingly, display objects and/or media can be presented according to a detected orientation, e.g., portrait or landscape. In some implementations, the mobile device 700 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 700 or provided as a separate device that can be coupled to the mobile device 700 through an interface (e.g., port device 790) to provide access to location-based services.

In some implementations, a port device 790, e.g., a Universal Serial Bus (USB) port, or a docking port, or some other wired port connection, can be included. The port device 790 can, for example, be utilized to establish a wired connection to other computing devices, such as other communication devices 700, network access devices, a personal computer, a printer, a display screen, or other processing devices capable of receiving and/or transmitting data. In some implementations, the port device 790 allows the mobile device 700 to synchronize with a host device using one or more protocols, such as, for example, the TCP/IP, HTTP, UDP and any other known protocol.

The mobile device 700 can also include a camera lens and sensor 780. In some implementations, the camera lens and sensor 780 can be located on the back surface of the mobile device 700. The camera can capture still images and/or video.

The mobile device 700 can also include one or more wireless communication subsystems, such as an 802.11b/g communication device 786, and/or a Bluetooth™ communication device 788. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-Level Graphical User Interface

Figure 7B:
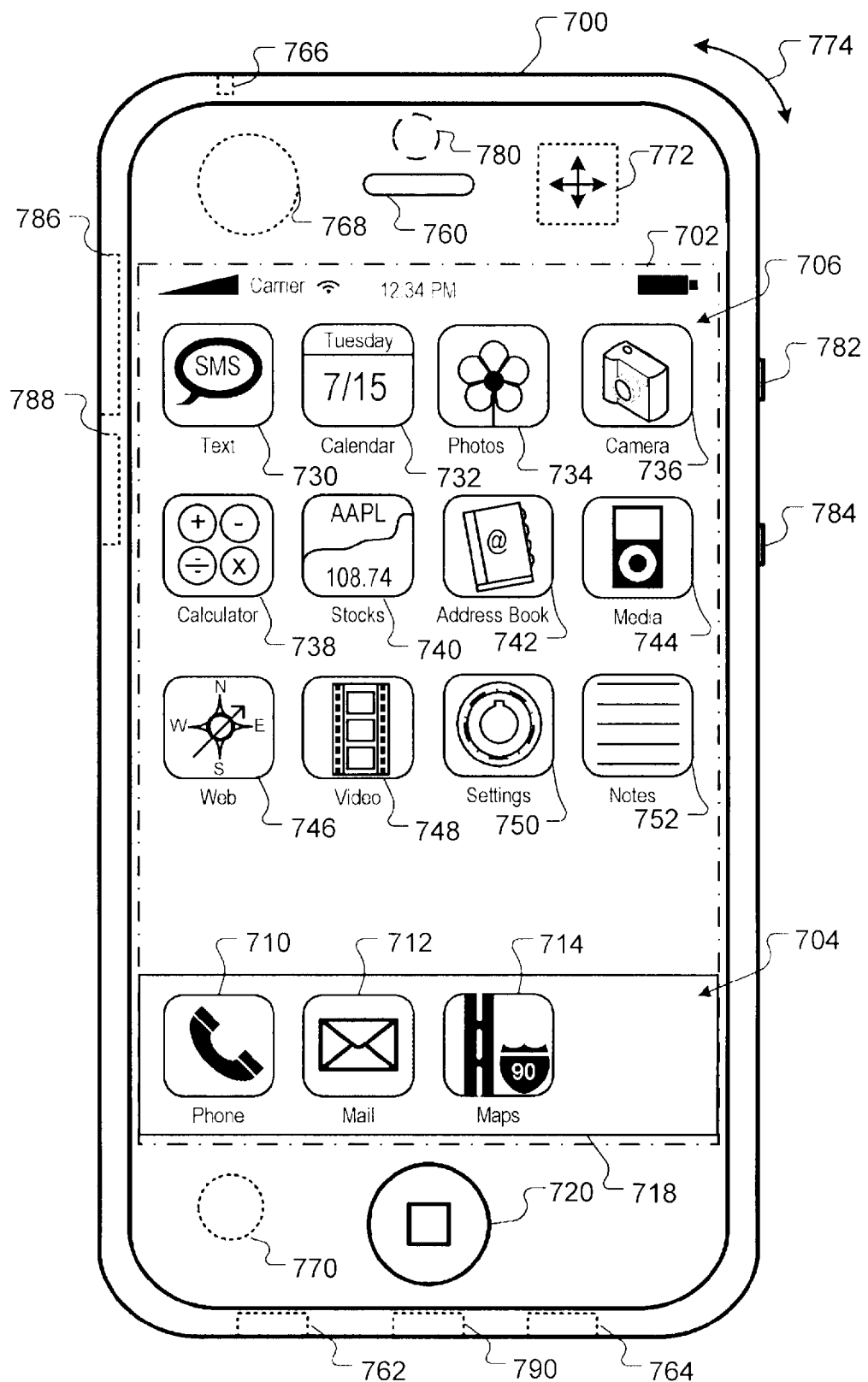
FIG. 7B is an elevation-view diagram illustrating an example of a configurable top-level graphical user interface for the mobile device of FIG. 7A.

FIG. 7B illustrates another example of configurable top-level graphical user interface of device 700. The device 700 can be configured to display a different set of display objects.

In some implementations, each of one or more system objects of device 700 has a set of system object attributes associated with it; and one of the attributes determines whether a display object for the system object will be rendered in the top-level graphical user interface. This attribute can be set by the system automatically, or by a user through certain programs or system functionalities as described below. FIG. 7B shows an example of how the Notes object 752 (not shown in FIG. 7A) is added to and the Web Video object 716 is removed from the top graphical user interface of device 700 (e.g. such as when the attributes of the Notes system object and the Web Video system object are modified).

Example Mobile Device Architecture

Figure 8:
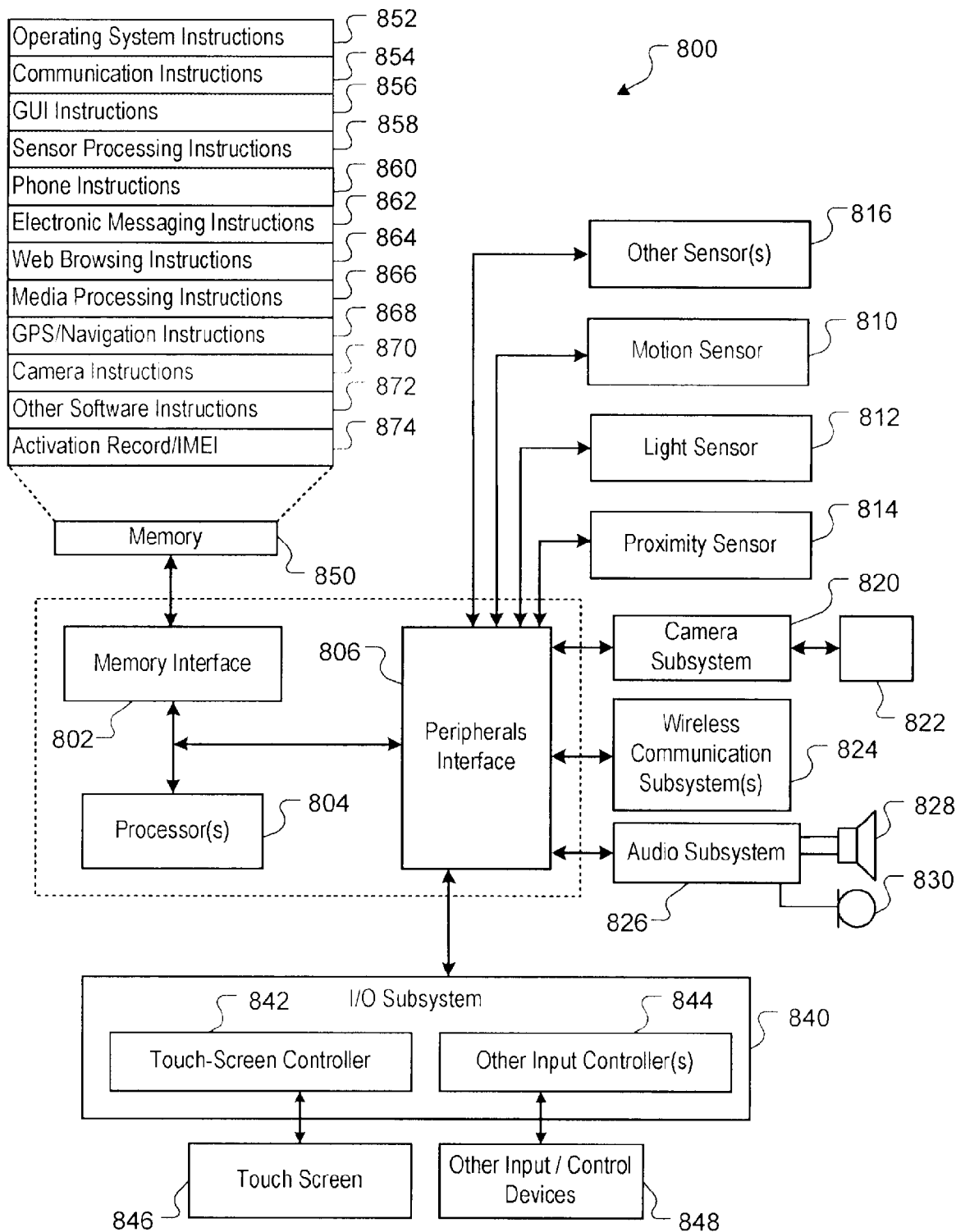
FIG. 8 is a block diagram illustrating an example implementation of the mobile device of FIG. 7A.

FIG. 8 is a block diagram 800 of an example implementation of a mobile device (e.g., mobile device 700). The mobile device can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the mobile device can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate the orientation, lighting, and proximity functions described with respect to FIGURE 7A. Other sensors 816 can also be connected to the peripherals interface 806, such as a positioning system (e.g., GPS receiver), a temperature sensor, a biometric sensor, or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the mobile device is intended to operate. For example, a mobile device can include communication subsystems 824 designed to operate over a GSM network, a GPRS network, an EDGE network, a Wi-Fi or WiMax network, and a Bluetooth™ network. In particular, the wireless communication subsystems 824 may include hosting protocols such that the mobile device may be configured as a base station for other wireless devices.

An audio subsystem 826 can be coupled to a speaker 828 and a microphone 830 to facilitate voice-enabled functions, such as voice recognition, voice replication, digital recording, and telephony functions.

The I/O subsystem 840 can include a touch screen controller 842 and/or other input controller(s) 844. The touch-screen controller 842 can be coupled to a touch screen 846. The touch screen 846 and touch screen controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration may disengage a lock of the touch screen 846; and a pressing of the button for a second duration that is longer than the first duration may turn power to the mobile device on or off. The user may be able to customize a functionality of one or more of the buttons. The touch screen 846 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks. The operating system 852 may include instructions for handling basic system services and for performing hardware dependent tasks. In some implementations, the operating system 852 can be a kernel (e.g., UNIX kernel).

The memory 850 may also store communication instructions 854 to facilitate communicating with one or more additional devices, one or more computers and/or one or more servers. The memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; and/or other software instructions 872 to facilitate other processes and functions. The memory 850 may also store other software instructions (not shown), such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) 874 or similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the mobile device may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal), that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
  determining, by a host electronic device, whether a profile exists for a media device automatically in response to the media device being communicatively coupled with the host electronic device, the host electronic device having an integrated development environment to develop applications for execution on media devices;
  determining, by the host electronic device, whether the media device is to be used to test the applications developed by the integrated development environment in response to determining that the development profile does not exist for the media device;
  creating, by the host electronic device, a personal profile for the media device in response to determining the media device is not to be used to test the applications;
  creating, by the host electronic device, a development profile for the media device in response to determining the media device is to be used to test the applications; and
  determining, by the host electronic device, whether to download an application to the media device for testing based on the profile,: wherein the personal profile prevents the integrated development environment from downloading the application and the development profile enables the integrated development environment to download the application.

2. The method of claim 1, further comprising:
  downloading, by the integrated development environment, the application to the media device to test the application on the media device.

3. The method of claim 1 wherein the development profile enables the integrated development environment to enable restricted access to development on the media device.

4. The method of claim 1 wherein creating the development profile comprises:
  determining whether the media device has an associated authorized user identifier; and
  creating the development profile if the authorized user identifier is found.

5. An apparatus comprising:
  means for determining whether a profile exists for a media device automatically in response to the media device being communicatively coupled with a host electronic device having an integrated development environment to develop applications for execution on media devices;
  means for determining whether the media device is to be used to test the applications developed by the integrated development environment in response to determining that a profile does not exist for the media device;
  means for creating a personal profile for the media device in response to determining the media device is not to be used to test the applications;
  means for creating a development profile for the media device in response to determining the media device is to be used to test the applications; and
  means for determining whether to download an application to the media device for testing based on the profile, wherein the personal profile prevents the integrated development environment from downloading the application and the development profile enables the integrated development environment to download the application.

6. The apparatus of claim 5, further comprising:
  means for downloading, by the integrated development environment, the application to the media device to test the application on the media device.

7. The apparatus of claim 5 wherein the development profile enables the integrated development environment to enable restricted access to development on the media device.

8. The apparatus of claim 5 wherein creating the development profile comprises:
  means for determining whether the media device has an associated authorized user identifier; and
  means for creating the development profile if the authorized user identifier is found.

9. A system comprising:
  a media device having a processor, a memory and a communication interface; and
  a host electronic device coupled with the media device via the communication interface,
    the host electronic device having an integrated development environment to develop applications for execution on media devices,
    the host electronic device further having a profile management module to determine whether a profile exists for the media device automatically in response to the media device being communicatively coupled with the host electronic device, to determine whether the media device is to be used to test applications developed by the integrated development environment in response to determining that the development profile does not exist for the media device, to create a personal profile in response to determining the media device is not to be used to test applications, and to create a development profile for the media device in response to determining the media device is to be used to test applications, and
    the host electronic device operable to determine whether to download an application to the media device for testing based on the profile, wherein the personal profile prevents the integrated development environment from downloading the application and the development profile enables the integrated development environment to download the application.

10. The system of claim 9 wherein the development profile is stored on the media device.

11. The system of claim 9 wherein the development profile is stored on the host electronic device.

12. The system of claim 9 wherein the development profile is stored on a removable storage medium inserted into the host electronic device.

13. An article comprising a computer-readable storage medium having stored thereon instructions that, when executed, cause one or more processors to:
  determine whether a profile exists a media device automatically in response to the media device being communicatively coupled with a host electronic device having an integrated development environment to develop applications for execution on media devices;
  determine whether the media device is to be used to test the applications developed by the integrated development environment in response to determining that a profile does not exist for the media device;

create a personal profile for the media device in response to determining the media device is not to be used to test the applications;

create a development profile for the media device in response to determining the media device is to be used to test applications; and determining whether to download an application to the media device for testing based on the profile, wherein the personal profile prevents the integrated development environment from downloading the application ind the development profile enables the integrated development environment to download the application.

14. The article of claim 13, further comprising:

downloading, by the inteerated development environment, the application to the media device to test the application on the media device.

15. The article of claim 13 wherein the development profile enables the integrated development environment to enable restricted access to development on the media device.

16. The article of claim 13 wherein the instructions that cause the one or more processors to create the development profile comprise instructions that, when executed, cause the one or more processors to:

determine whether the media device has an associated authorized user identifier; and create the development profile if the authorized user identifier is found.

* * * * *